US 6,735,811 B2

(12) United States Patent
Field et al.

(10) Patent No.: US 6,735,811 B2
(45) Date of Patent: May 18, 2004

(54) CLEANING LIQUID DISPENSING SYSTEM FOR A HARD FLOOR SURFACE CLEANER

(75) Inventors: Bruce F. Field, Golden Valley, MN (US); Joseph K. Krueger, Hopkins, MN (US); Bryan Christensen, Dayton, MN (US); Richard M. Pierce, Coon Rapids, MN (US); James J. Seifert, Woodbury, MN (US)

(73) Assignee: Tennant Company, Minneapolis, MN (US)

( * ) Notice: Subject to any disclaimer, the term of this patent is extended or adjusted under 35 U.S.C. 154(b) by 0 days.

(21) Appl. No.: 10/143,582

(22) Filed: May 9, 2002

(65) Prior Publication Data

US 2003/0019069 A1 Jan. 30, 2003

Related U.S. Application Data

(63) Continuation-in-part of application No. 10/026,411, filed on Dec. 21, 2001.
(60) Provisional application No. 60/308,773, filed on Jul. 30, 2001.

(51) Int. Cl.[7] ................................................ A47L 11/03
(52) U.S. Cl. ............................... 15/320; 15/383; 15/353
(58) Field of Search .......................... 15/320, 383, 353; 401/37, 138, 139, 140, 188 R; 222/333, 334, 332; 137/565.16, 565.17; 251/121

(56) References Cited

U.S. PATENT DOCUMENTS

| | | | |
|---|---|---|---|
| 2,563,151 A | 8/1951 | Bjorksten | 134/111 |
| 2,731,659 A | 1/1956 | Coplen | 15/320 |
| 2,993,494 A | 7/1961 | Svensson | 134/169 |
| 3,037,887 A | 10/1962 | Brenner et al. | 134/22 |
| 3,078,190 A | 2/1963 | Blaser et al. | 134/10 |
| 3,162,427 A | 12/1964 | Knudson et al. | 259/4 |
| 3,212,762 A | 10/1965 | Carroll et al. | 261/124 |
| 3,231,134 A | 1/1966 | Webster | 222/1 |
| 3,392,418 A | 7/1968 | Schowalter | 15/320 |
| 3,436,262 A | 4/1969 | Crowe et al. | 134/10 |

(List continued on next page.)

FOREIGN PATENT DOCUMENTS

| | | |
|---|---|---|
| DE | 44 13 783 A1 | 3/1995 |
| EP | 0 744 148 A2 | 11/1996 |
| EP | 1 044 645 A2 | 10/2000 |
| JP | 11216092 | 8/1999 |
| WO | WO 95/09557 | 4/1995 |
| WO | WO 00/35333 | 6/2000 |
| WO | WO 02/05047 | 1/2002 |
| WO | WO 02/06435 | 1/2002 |

OTHER PUBLICATIONS

International Search Report from International Application No. PCT/US 02/19367, filed Jun. 17, 2002, dated Dec. 12, 2002.
International Search Report from the European Patent Office for International Application No. PCT/US 02/23823, dated Mar. 13, 2003.
Discover Magazine, Jun. 2002, "Does the Universe Exist if We Don't Observe It?", including cover, Table of Contents, and pp. 26 and 27.
International Search Report from International Application No. PCT/GB 02/23758 filed Jul. 26, 2002 (date of report Nov. 14, 2002.

*Primary Examiner*—Theresa T. Snider
(74) *Attorney, Agent, or Firm*—Westman, Champlin & Kelly (57) ABSTRACT

A cleaning liquid dispensing system for use in a mobile hard floor surface cleaner includes fluid conduit and fluid communication with a supply of cleaning liquid, a pump, and a flow restriction member. The pump is adapted to drive a flow of the cleaning liquid through the conduit. The flow restriction member generates a pressure drop in the conduit, thereby restricting the flow of the cleaning liquid therethrough.

59 Claims, 11 Drawing Sheets

U.S. PATENT DOCUMENTS

| | | | |
|---|---|---|---|
| 3,453,678 A | 7/1969 | Gehman et al. | 15/50.1 |
| 3,490,948 A | 1/1970 | Farison | 134/36 |
| 3,535,162 A | 10/1970 | Bray et al. | 134/42 |
| 3,549,420 A | 12/1970 | Cunningham | 134/22 |
| 3,655,096 A | 4/1972 | Easter | 222/82 |
| 3,676,889 A | 7/1972 | Edlin | 15/320 |
| 3,761,987 A | 10/1973 | Nayfa et al. | 15/50 |
| 3,774,262 A | 11/1973 | Anthony et al. | 15/322 |
| 3,789,449 A | 2/1974 | MacFarland et al. | 15/4 |
| 3,823,727 A | 7/1974 | Fry | 137/88 |
| 3,931,662 A | 1/1976 | Nayfa et al. | 15/320 |
| 3,940,826 A | 3/1976 | Phillips et al. | 15/320 |
| 4,000,536 A | 1/1977 | Nayfa et al. | 15/50 |
| 4,061,001 A | 12/1977 | Von der Eltz et al. | 68/200 |
| 4,107,075 A | 8/1978 | Kramer | 252/359 |
| 4,133,773 A | 1/1979 | Simmons | 252/359 |
| 4,167,798 A | 9/1979 | Klügl et al. | 15/320 |
| 4,167,799 A | 9/1979 | Webb | 15/320 |
| 4,191,590 A | 3/1980 | Sundheim | 134/21 |
| 4,369,544 A | 1/1983 | Parisi | 15/320 |
| 4,393,538 A | 7/1983 | Olson | 15/320 |
| 4,413,769 A | 11/1983 | Michetti | 229/27 |
| 4,419,141 A | 12/1983 | Kunkel | 134/22.12 |
| 4,429,432 A | 2/1984 | Copeland et al. | 15/320 |
| 4,511,486 A | 4/1985 | Shah | 252/90 |
| 4,570,856 A | 2/1986 | Groth et al. | 239/310 |
| 4,595,420 A | 6/1986 | Williams, III et al. | 134/6 |
| 4,667,364 A | 5/1987 | Meili | 15/320 |
| 4,676,287 A | 6/1987 | Fitzwater | 141/285 |
| 4,676,926 A | 6/1987 | Kappler | 252/307 |
| 4,780,243 A | 10/1988 | Edgley et al. | 252/307 |
| 4,819,676 A | 4/1989 | Blehert et al. | 134/21 |
| 4,822,431 A | 4/1989 | Bricher et al. | 134/28 |
| 4,849,027 A | 7/1989 | Simmons | 134/22.18 |
| 4,881,288 A | 11/1989 | May et al. | 15/98 |
| 4,974,618 A | 12/1990 | Nysted | 134/21 |
| 5,031,837 A | 7/1991 | Hanish | 239/267 |
| 5,060,342 A | 10/1991 | Brazier | 15/322 |
| 5,133,107 A | 7/1992 | MacDonald | 15/50.4 |
| 5,213,120 A | 5/1993 | Dickson | 134/102.1 |
| 5,383,605 A | 1/1995 | Teague | 239/526 |
| 5,462,607 A | 10/1995 | Mestetsky et al. | 134/22.12 |
| 5,509,972 A | 4/1996 | Akazawa et al. | 134/26 |
| 5,566,422 A | 10/1996 | Geyer | 15/320 |
| 5,593,091 A | 1/1997 | Harris | 239/127 |
| 5,649,643 A | 7/1997 | Ridgeway | 222/105 |
| 5,813,086 A | 9/1998 | Ueno et al. | 15/320 |
| 5,853,814 A | 12/1998 | Murphy | 427/434.6 |
| 5,871,152 A | 2/1999 | Saney | 239/8 |
| 6,090,217 A | 7/2000 | Kittle | 134/11 |
| 6,209,756 B1 | 4/2001 | Van Der Heijden | 222/105 |
| 6,276,613 B1 | 8/2001 | Kramer | 239/304 |
| 6,418,586 B2 | 7/2002 | Fulghum | 15/320 |

CLEANING LIQUID DISPENSING SYSTEM FOR A HARD FLOOR SURFACE CLEANER

CROSS-REFERENCE TO RELATED APPLICATIONS

The present application is a Continuation-in-Part of U.S. application Ser. No. 10/026,411, filed Dec. 21, 2001 and entitled "APPARATUS AND METHOD OF USE FOR CLEANING A HARD FLOOR SURFACE UTILIZING AN AERATED CLEANING LIQUID," which in turn claims priority to U.S. Provisional Application Ser. No. 60/308,773, filed Jul. 30, 2001 and entitled "APPARATUS AND METHOD OF USE FOR CLEANING A HARD FLOOR SURFACE UTILIZING AN AERATED CLEANING LIQUID." Reference is also hereby made to the following related co-pending applications: U.S. application Ser. No. 10/152,537, filed May 21, 2002 and entitled "CHEMICAL DISPENSER FOR A HARD FLOOR SURFACE CLEANER; and U.S. Application Ser. No. 10/152,549, filed May 21, 2002, and entitled "CLEANER CARTRIDGE". All of the above-referenced applications are incorporated herein by reference in their entirety.

FIELD OF THE INVENTION

The present invention relates generally to mobile hard floor surface cleaners and, more particularly, to a controlled cleaning liquid dispensing system for use in a hard floor surface cleaner.

BACKGROUND OF THE INVENTION

Hard floor surface cleaners are widely used to clean the floors of industrial and commercial buildings. They range in size from a small model that is controlled by an operator walking behind and may clean a path ranging from 15 inches to 36 inches wide, to a large model that is controlled by an operator riding on the machine and can clean a path as wide as 5 feet. These hard floor cleaners include motorized drive wheels, a solution tank to hold a cleaning solution and a recovery tank to hold soiled cleaning solution recovered from the floor being scrubbed. The cleaning solution from the solution tank is applied to the hard floor surface adjacent a scrub head. The scrub head generally contains one or more motorized scrubbing brushes attached either in front of, under, or behind the vehicle. These scrubbing brushes typically rotate to provide the desired scrubbing action. The soiled cleaning solution is then recovered using a solution recovery system, which returns the soiled cleaning solution to the recovery tank.

The cleaning solution is typically gravity fed to the scrub head at a rate that varies in response to the volume of cleaning solution contained in the solution tank. As the volume of cleaning solution contained in the solution tank decreases, the rate at which the cleaning solution is fed to the scrub head decreases. For example, a typical hard floor cleaner having a 32 inch wide scrubbing swath applies the cleaning solution to the hard floor surface at a rate that varies from between approximately 1.0 gallons per minute (GPM) when the solution tank is full to a rate of 0.5 GPM when the tank contains a low volume of cleaning solution.

One problem with prior art hard floor cleaners has been their limited operational runtime. This is primarily due to their limited solution tank volume and the high cleaning solution flow rates. For example, a typical 32 inch cleaning swath hard floor surface cleaner has an operational runtime based on solution capacity of approximately 30–40 minutes.

One possible solution to increase runtime for these cleaners is to increase the size of the solution tank. Unfortunately, an increase in cleaning solution capacity typically necessitates modifications to the frame and other components of the hard floor surface cleaner, which results in additional weight and energy requirements for the device. For most applications, these modifications are simply impractical.

The high volume flow rate of cleaning solution is generally desired to provide complete wetting of the floor being cleaned. Unfortunately, the lack of control of the volume flow rate of the cleaning solution results in an excessive amount of cleaning solution being distributed to the floor, when, for example, the solution tank is full. The high volume flow rate of the cleaning solution of prior art hard floor surface cleaners also results in extended downtime. The long downtime periods are generally due to the numerous disposals of soiled cleaning solution and refills of cleaning solution that must be performed for a given job. Additionally, where the cleaning process removes harmful or hazardous chemicals, the disposal of the soiled cleaning solution may require special handling and/or additional costs to ensure that it is disposed of properly. As a result, the large volumes of cleaning solution that are used by prior art hard floor surface cleaners reduce the efficiency at which a cleaning job can be performed.

As a result, prior art hard floor surface cleaners suffer from several deficiencies that lead to inefficient floor cleaning operations. Most of these deficiencies stem from the poor control of the flow rate of cleaning solution as applied to the hard floor surface.

SUMMARY OF THE INVENTION

The present invention is directed to a cleaning liquid dispensing system for use in a mobile hard floor surface cleaner that provides a substantially constant flow of cleaning liquid that can be provided to the scrubbing components of the cleaner. This results in more efficient use of the cleaning liquid, longer operational runtimes and shorter downtime. The cleaning liquid dispensing system includes fluid conduit in fluid communication with a supply of cleaning liquid, a pump, and a flow restriction member. The pump is adapted to drive a flow of the cleaning liquid through the conduit. The flow restriction member generates a pressure drop in the conduit, thereby restricting the flow of the cleaning liquid therethrough.

Other features and benefits that characterize embodiments of the present invention will be apparent upon reading the following detailed description and review of the associated drawings.

DETAILED DESCRIPTION OF THE PREFERRED EMBODIMENTS

Figure 1:
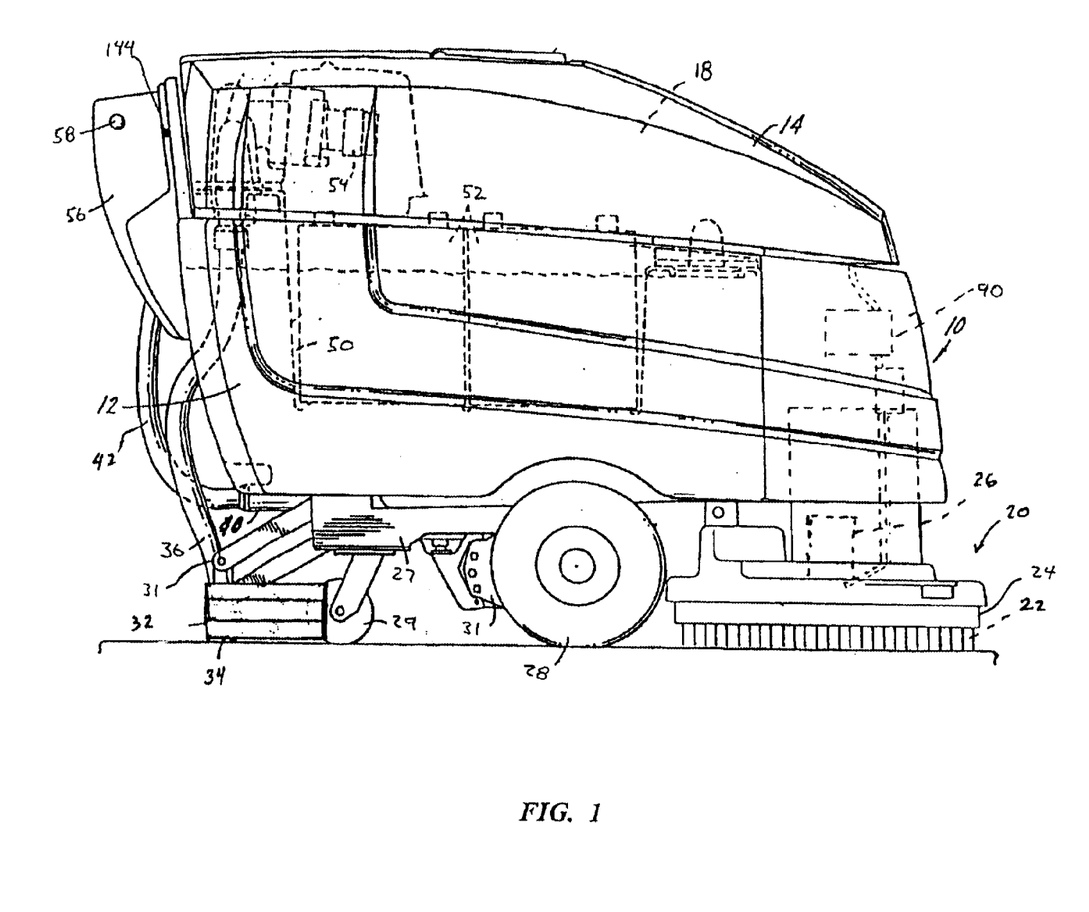
FIGS. 1 and 2 are simplified side elevation views of hard floor surface cleaners in accordance with various embodiments of the present invention.

FIG. 1 illustrates a hard floor surface cleaner 10 in which embodiments of the present invention can be used. The illustrated cleaner 10 is a walk-behind cleaner used to clean hard floor surfaces, such as concrete, tile, vinyl, terrazzo, etc. Alternatively, cleaner 10 can be a ride-on or towed-behind cleaner performing a scrubbing operation as described herein. Cleaner 10 may include electrical motors powered through an on-board power source, such as batteries, or through an electrical cord. Alternatively, an internal combustion engine system could be used either alone, or in combination with, the electric motors. Cleaner 10 generally includes a recovery tank 12 and a lid 14. Lid 14 is attached along one side of the recovery tank 12 by hinges (not shown) so that lid 14 can be pivoted up to provide access to the interior of tank 12. Cleaner 10 also includes a tank 18 for containing cleaning liquid or a primary cleaning liquid component that is applied to the hard floor surface during cleaning operations.

A scrub head 20 includes a scrubbing member 22, shrouds 24, and a scrubbing member drive 26. Scrubbing member 22 may be one or more brushes, such as bristle brushes, pad scrubbers, or other hard floor surface scrubbing elements. Drive 26 includes one or more electric motors to rotate the scrubbing member 22. Scrubbing member 22 may be a disc-type scrub brush rotating about a generally vertical axis of rotation relative to the hard floor surface. Alternatively, scrubbing member 22 may be a cylindrical-type scrub brush rotating about a generally horizontal axis of rotation relative to the hard floor surface. Drive 26 may also oscillate scrubbing member 22. Scrub head 20 is attached to cleaner 10 such that scrub head 20 can be moved between a lowered cleaning position and a raised travelling position.

A machine frame 27 supports recovery tank 12 on wheels 28 and castors 29. Details of the frame are shown and described in U.S. Pat. No. 5,611,105, the disclosure of which is incorporated herein by reference. Wheels 28 are preferably driven by a motor and transaxle assembly shown schematically at 30. The rear of the frame carries a linkage 31 to which a fluid recovery device 32 is attached. In the embodiment of FIG. 1, the fluid recovery device 32 includes a vacuum squeegee 34 and vacuum communication with an inlet chamber in recovery tank 12 through a hose 36. The bottom of the inlet chamber is provided with a drain 40 with a drain hose 42 connected to it.

Figure 2:
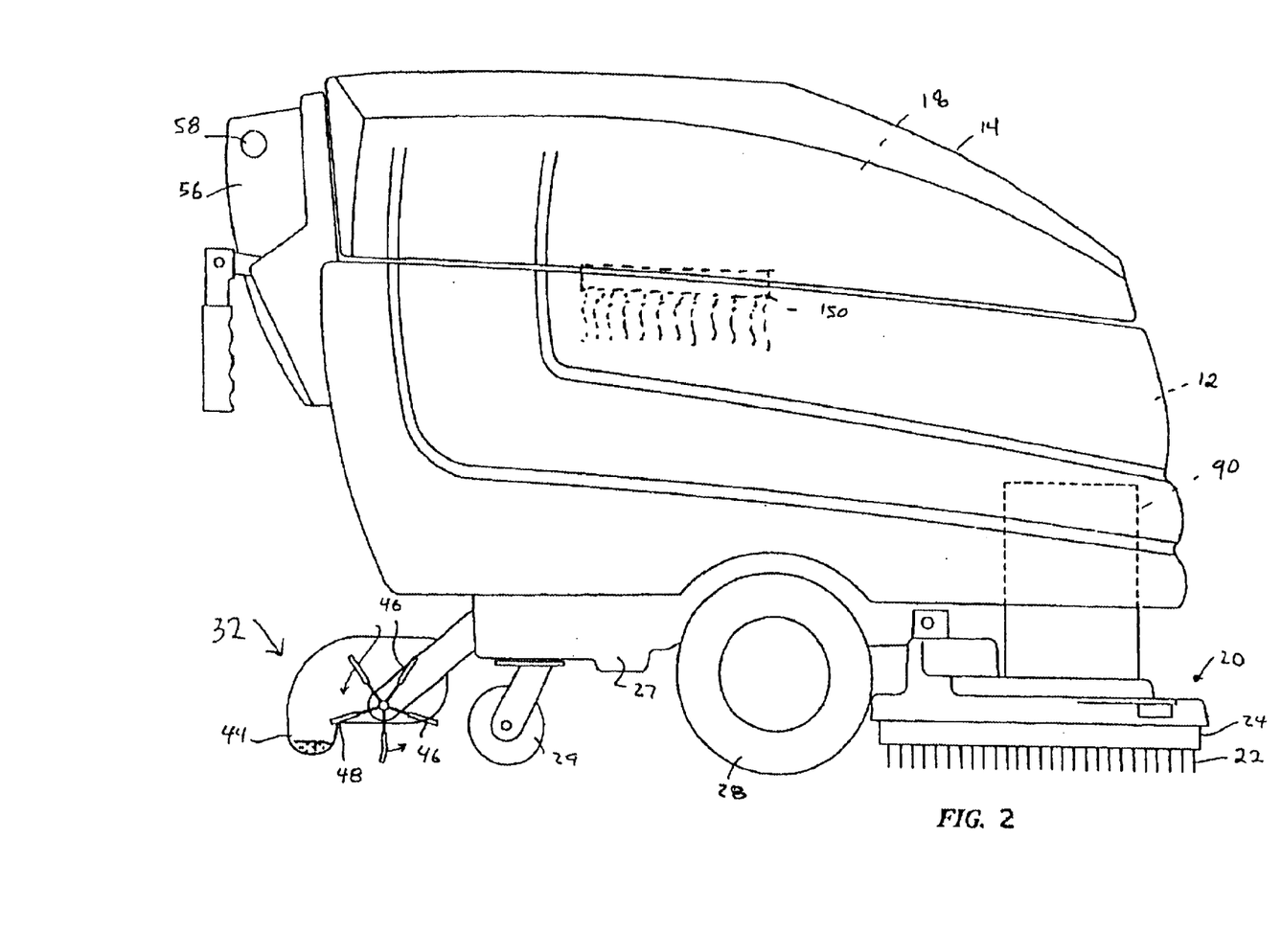

FIG. 2 illustrates hard floor surface cleaner 10 utilizing an alternative soiled solution recovery device 32. In accordance with this embodiment, the soiled solution recovery device 32 includes a non-vacuumized mechanical device for lifting the soiled solution away from the floor surface and conveying the soiled solution toward a collection tank or receptacle 44. The non-vacuumized mechanical device includes a plurality of wiping medium such as pliable material elements 46 which are rotated into contact with the floor surface to engage and lift the soiled solution from the floor surface. The pliable material elements 46 may be of an absorbent material. The pliable material elements 46 convey the solution to the collection receptacle 44. Solution captured on the pliable elements 46 may be removed via a mechanical action, such as through a shearing device or a squeezing device. In the embodiment of FIG. 2, the mechanical action used to remove soiled solution from the pliable material elements 46 is a scraper bar 48 which engages the pliable material elements 46 to release the soiled solution. Alternative mechanical devices, structures, or systems may be used to convey the soiled solution from the floor surface toward a collection receptacle.

Cleaner 10 can include a battery compartment 50 in which batteries 52 reside as shown in FIG. 1. Batteries 52 provide power to drive motors 26, vacuum fan 54, and other electrical components of cleaner 10. Vacuum fan 54 is mounted in the lid 14. A control unit 56 mounted on the rear of the body of cleaner 10 includes steering control handles 58 and operating controls and gages for cleaner 10. Additional aspects of automatic hard floor surface cleaners are disclosed in U.S. Pat. Nos. 5,483,718; 5,515,568; and 5,566,422, each of which are incorporated herein by reference.

The present invention is directed to a cleaning liquid dispensing system 60 for use in a hard floor surface cleaner, such as cleaner 10, that can provide a near constant flow of cleaning liquid to scrub head 20 or other cleaner component. The cleaning liquid dispensing system 60 generally includes fluid conduit 62 and fluid communication with a supply of cleaning liquid 64, a pump 66, and a flow restriction member 68, as shown in the schematic diagram of FIG. 3 and in the front elevation view in FIG. 4. Pump 66 is configured to drive a flow of cleaning liquid from supply 64 through conduit 62. Flow restriction member 68 is configured to generate a pressure drop in conduit 62 to thereby restrict the flow of cleaning liquid therethrough. This results in a controlled output flow 70 of cleaning liquid that can be provided to a cleaning liquid distributor 71 that directs the flow of cleaning liquid to a hard floor surface, or other cleaner component. A solenoid actuated on/off valve 72 can be installed to open and close the fluid flow path of conduit 62.

The output flow 70 is preferably maintained at a substantially constant low volume flow rate that is desired for the cleaning operation. This near constant low flow rate of the output flow 70 of cleaning liquid provides significant improvements over the prior art gravity-fed fluid dispensing systems. The prior art cleaners that have a varying flow rate of cleaning liquid must be configured to ensure that the minimum flow rate of cleaning liquid meets a desired flow rate of cleaning liquid that is necessary to perform the cleaning operation. Unfortunately, this results in much higher flow rates and, possibly, much lower flow rates then designed. The cleaning liquid dispensing system 60 of the present invention maintains a constant flow rate in accordance with what is desired for the cleaning operation. In other words, when the required flow rate of cleaning liquid is 0.5 GPM, the prior art cleaner will have a flow rate that varies from substantially greater than 0.5 GPM down to 0.5 GPM, whereas the cleaning liquid dispensing system 60 of the present invention provides a constant flow of 0.5 GPM or less as desired.

In accordance with embodiments of the invention, the output flow 70 is preferably limited by flow restriction member 68 to approximately 0.2 GPM. This leads to longer operational runtimes shorter downtime, and faster floor cleaning operations. Furthermore, cleaning liquid expenses are also reduced since less is used for a given job. Also, this reduction in cleaning liquid reduces time spent disposing liquid waste and refilling the cleaner with cleaning liquid. Other advantages, such as faster floor drying, can also be realized by hard floor surface cleaners utilizing cleaning liquid dispensing system 60 of the present invention, further improving the efficiency of floor cleaning operations.

In accordance with one embodiment, cleaning liquid 64 is a mixture of a primary cleaning component and a cleaning chemical or agent, which can be stored, for example in tank 18, shown in FIG. 2. The primary cleaning component is preferably water. The cleaning agent preferably includes an anionic surfactant, a non-anionic surfactant, a cationic surfactant, or a combination thereof. A particularly preferred surfactant is DeTeric CP-Na-38 manufactured by DeForest Enterprises, Inc. of Boca Raton, Fla. A particularly preferred surfactant concentration of the cleaning liquid is approximately 0.1% of the primary cleaning liquid component. Alternative cleaning liquids may include one or more surfactants, builders, solvents, or other components.

Figure 3:
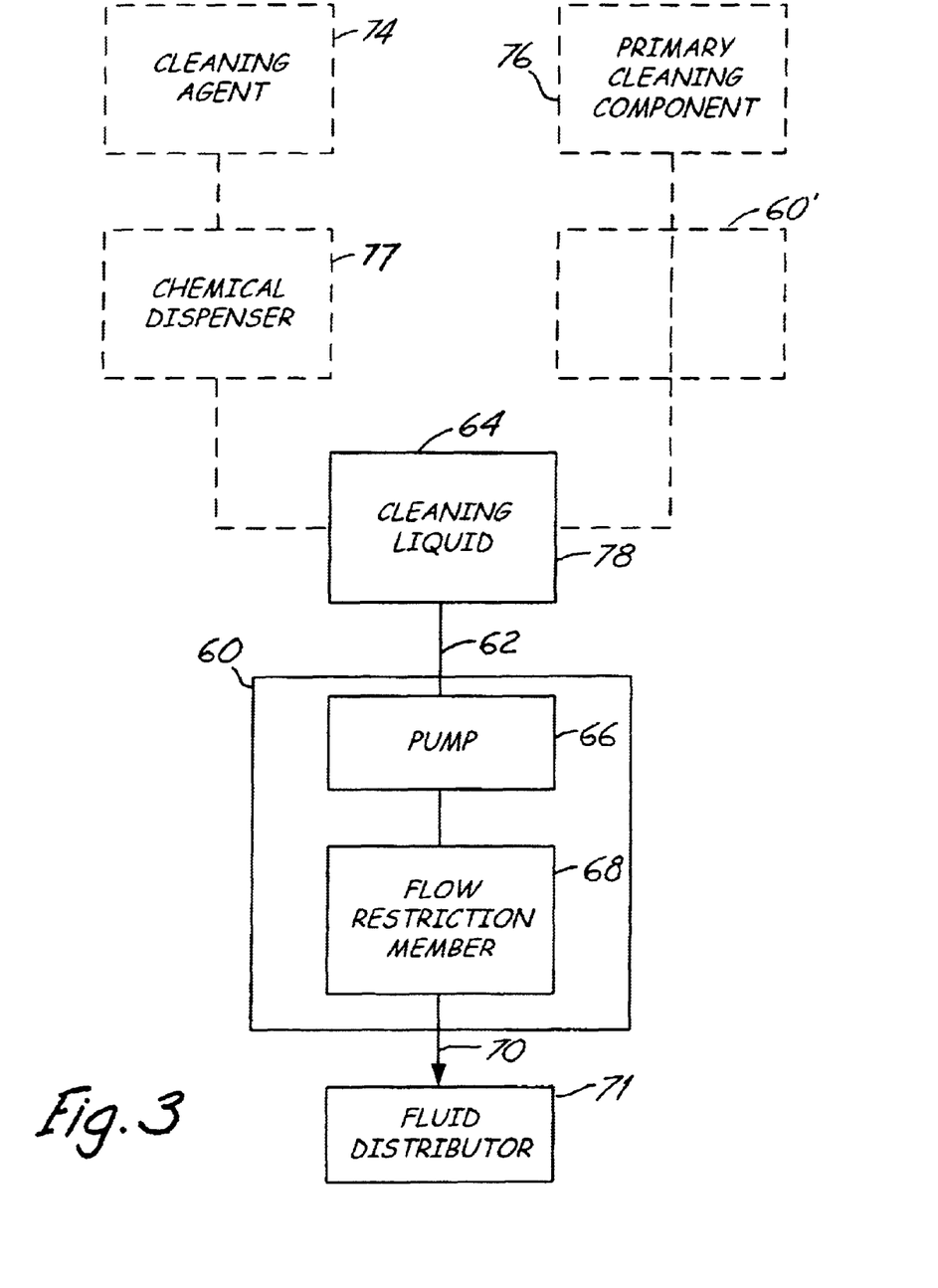
FIG. 3 is a schematic diagram illustrating a cleaning liquid dispensing system in accordance with embodiments of the invention.

In accordance with an alternative embodiment, the supply of cleaning liquid is formed as a combination of separate supplies of cleaning agent 74 and the primary cleaning liquid component 76 as indicated schematically in FIG. 3. The cleaning agent is preferably provided in concentrated form from supply 74, which could be a disposable cartridge. The supply of cleaning agent 74 is fluidically coupled to a chemical dispenser 77, which provides a predetermined volume flow rate, preferably 0.1% of the primary cleaning component, of cleaning agent to a fluid mixing member 78. The supply of primary cleaning liquid component 76 could be stored, for example, in tank 18, and is fluidically coupled to fluid mixing member 78. Fluid mixing member 78 combines the cleaning agent from chemical dispenser 77 and the primary cleaning liquid component to form the cleaning liquid 64. In accordance with this embodiment, cleaning liquid dispensing system 60 can be positioned to control the flow of the primary cleaning liquid component, as indicated by dashed box 60' of FIG. 3. It should be understood that multiple cleaning liquid dispensing systems 60 can be employed to provide the desired fluid flow control in cleaner 10.

Figure 4:
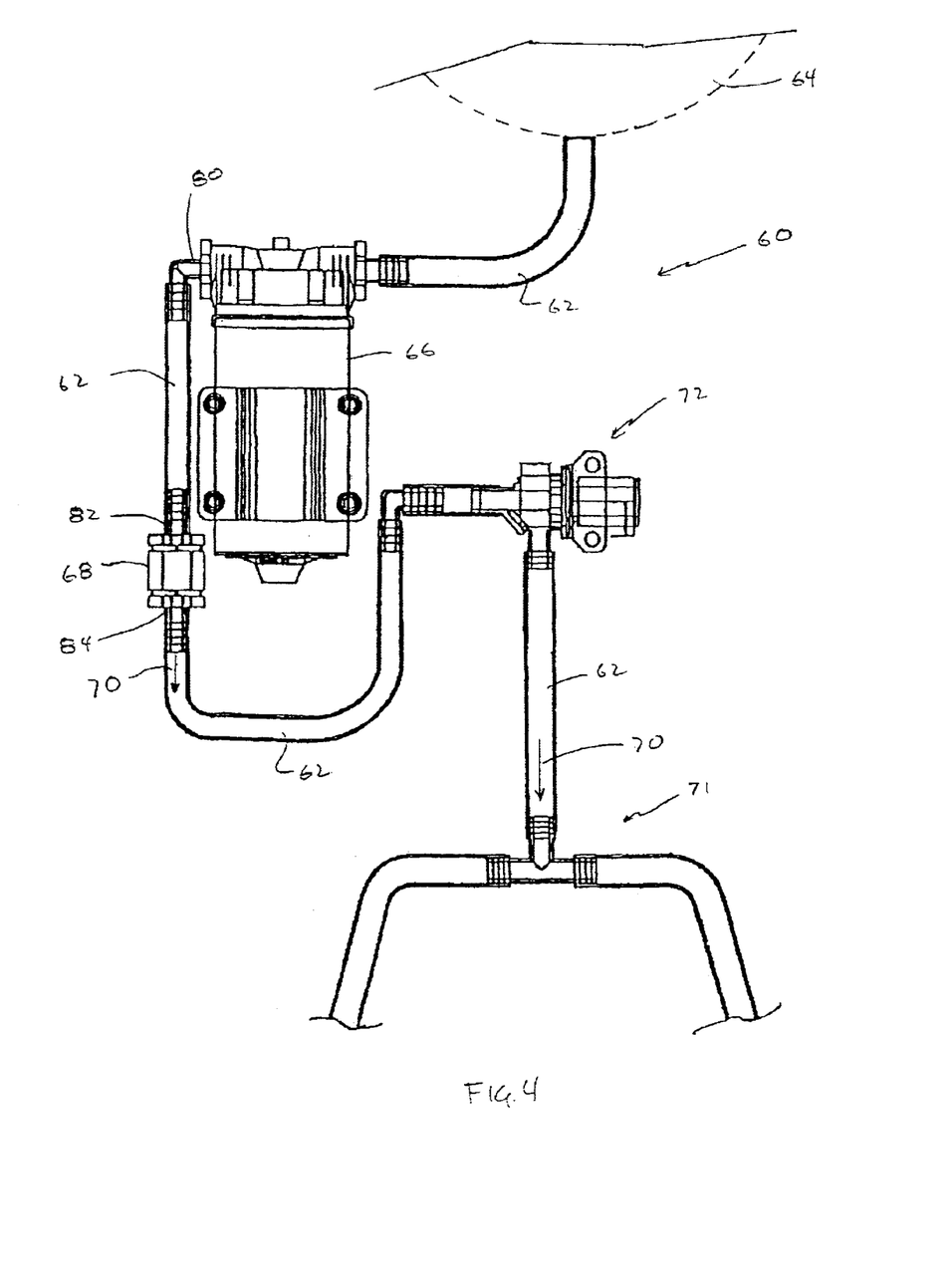
FIG. 4 is a front elevation view of a cleaning liquid dispensing system in accordance with an embodiment of the invention.

Pump 66 is generally positioned in line with fluid conduit 62 and includes an outlet 80, shown in FIG. 4, that is maintained at a high pressure The output flow 70 of cleaning liquid is provided through outlet 80 and through conduit 62. In accordance with one embodiment, the pressure at outlet 80 is held substantially constant at approximately 40 pounds per square inch (psi). In accordance with one embodiment, pump 66 is a diaphragm pump, such as diaphragm pump model number 8006-543-250 manufactured by Shur Flo of Garden Grove, Calif.

Flow restriction member 68 is generally positioned in line with conduit 62 and the flow of cleaning liquid. Flow restriction member 68 includes an upstream high pressure side 82 and a downstream low pressure side 84 as shown in FIG. 4. The pressure drop across flow restriction member 68 between high pressure side 82 and low pressure side 84 restricts the flow rate of the cleaning liquid through conduit 62 to provide the desired output flow 70. Multiple flow restriction members 68 can be employed to provide the desired pressure drop in conduit 62 and volume flow rate of flow 70.

Figure 5:
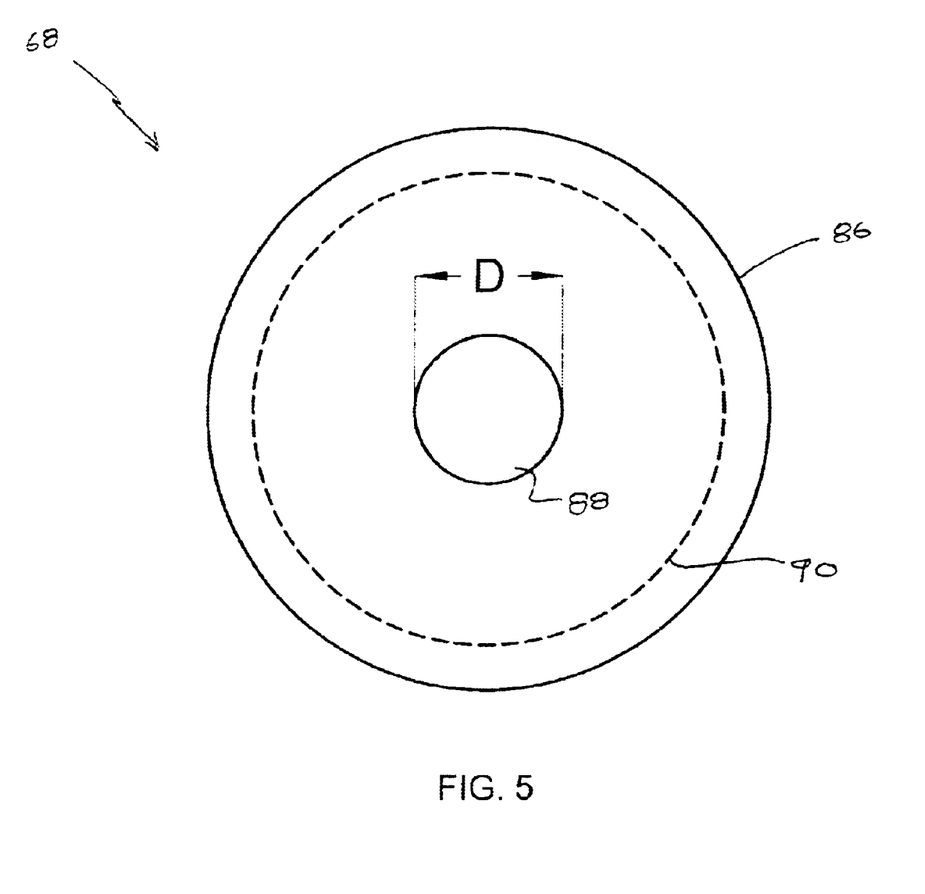
FIG. 5 is a schematic diagram of a flow restriction member in accordance with an embodiment of the invention.

In accordance with one embodiment, flow restriction member 68 is a metering orifice or orifice plate 86, shown schematically in FIG. 5. Orifice plate 86 includes an orifice 88 through which the output flow 70 of cleaning liquid flows. Plate 86 is installed in conduit 62, the inner diameter of which is indicated by dashed line 90, such that output flow 70 of cleaning liquid is forced to flow through orifice 88. This produces the pressure drop as described above and restricts the output flow 70 to the desired flow rate. In accordance with a preferred embodiment, orifice 88 of orifice plate 86 has a diameter D of approximately 0.03 inch to provide the desired output flow of 0.2 GPM when the pressure of outlet 80 of pump 66 is at 40 psi. One example of a suitable metering orifice or orifice plate 86 is part number CP 4916-40 manufactured by Spraying Systems Co. of Wheaton, Ill. Other orifice plates or metering orifice configurations are possible as well, such as by providing multiple orifices in the plate 86 or other flow restriction configurations.

In order to maintain the desired distribution of cleaning liquid to the hard floor surface during cleaning operations, the pressure at output 80 can be varied depending upon the velocity of cleaner 10. Thus, at slower speeds, the pressure at outlet 80 can be reduced to lower the output flow 70 of cleaning liquid and, thus, the volume of cleaning liquid that is applied to the hard floor surface. Likewise, as the velocity of the cleaner 10 is increased, the pressure at outlet 80 can be increased to increase the output flow of cleaning liquid 70 to maintain the desired distribution of cleaning liquid to the hard floor surface.

As described in greater detail below, the cleaning liquid can be aerated to create a foam-like aerated cleaning liquid that is delivered to the hard floor surface and utilized in the scrubbing process. The foam-like aerated cleaning liquid facilitates an efficient wetting of the floor surface. The preferred surfactant mentioned above can be used without additional additives to provide the desired foaming of the cleaning liquid. In general, the cleaning operation of this embodiment of the invention involves aerating the cleaning liquid into a foam-like aerated cleaning liquid (foamed cleaning liquid), applying the foamed cleaning liquid to the hard floor surface, working the foamed cleaning liquid with the scrub head 20, and substantially de-aerating the foamed cleaning liquid prior to recovering the soiled cleaning liquid with the recovery system. In operation, de-aeration of the aerated cleaning liquid is rapidly achieved during contact with scrubbing member 22. As a result, relatively little foam is transferred into the recovery tank 12 by the recovery system.

Figure 6:
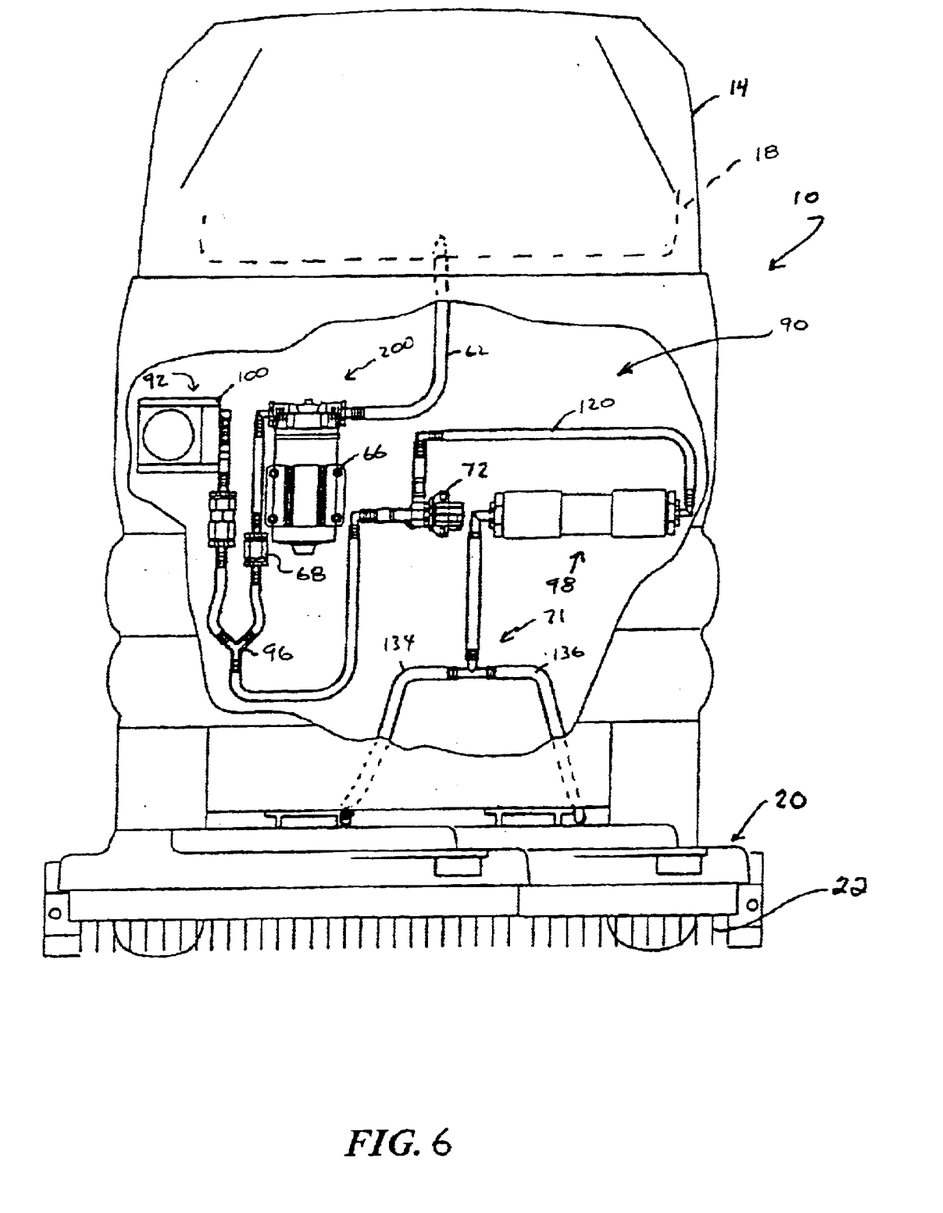
FIG. 6 is a front elevation view of a hard floor surface cleaner in accordance with embodiments of the invention.
Figure 7:
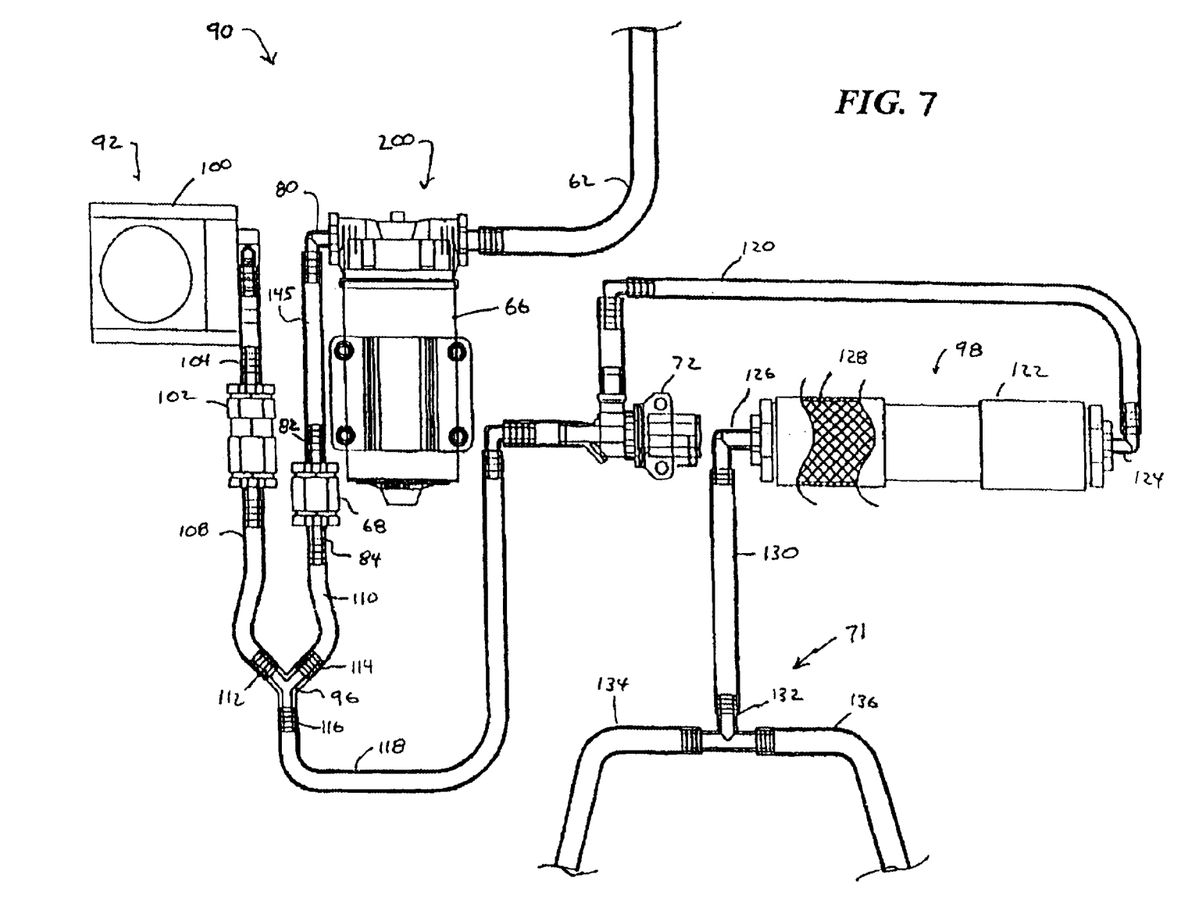
FIG. 7 is a detailed front elevation view of a cleaning liquid aeration system in accordance with an embodiment of the invention.
Figure 8:
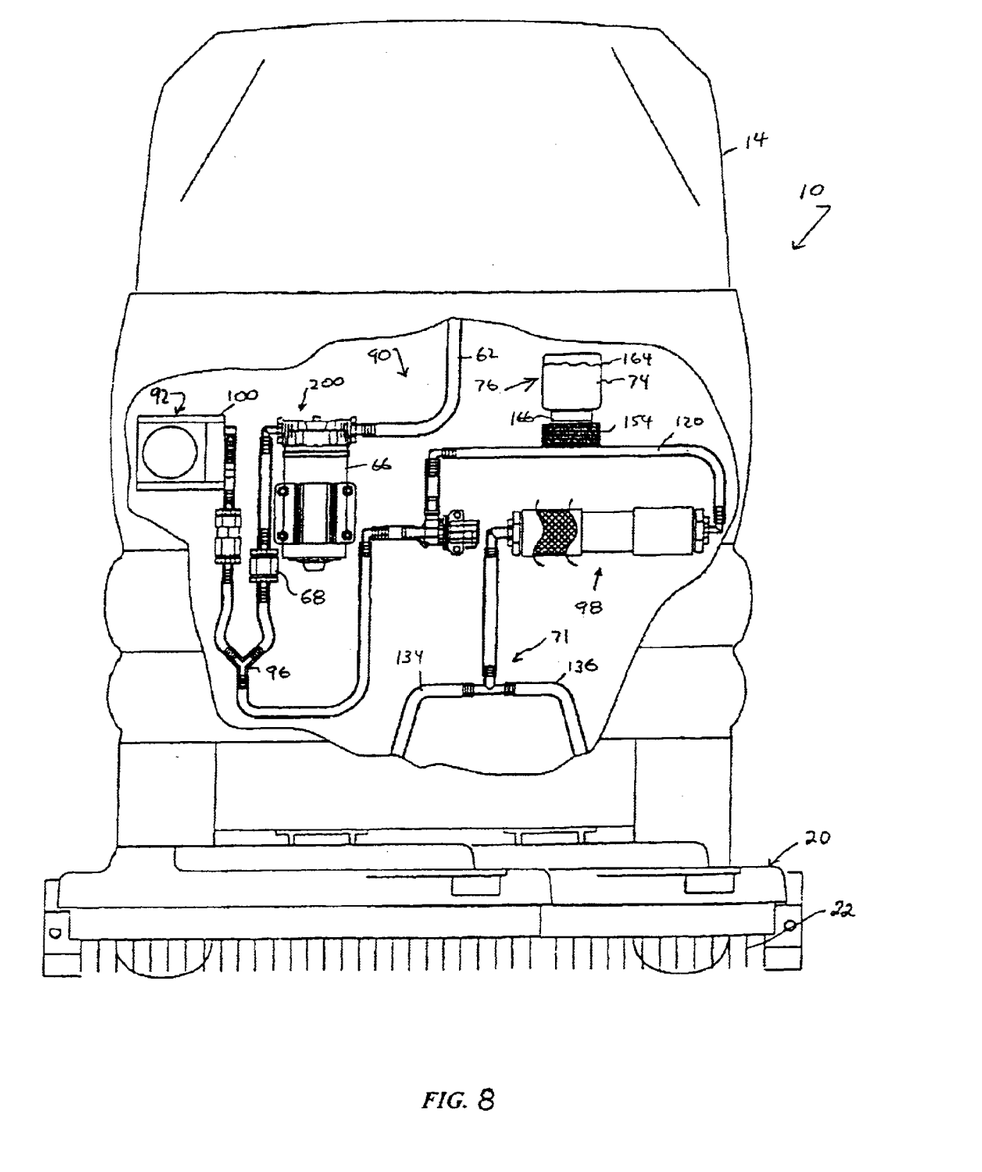
FIG. 8 is a front elevation view of the hard floor surface cleaner in accordance with embodiments of the invention.

Referring to FIGS. 6–8, a cleaning liquid aerator for generating the foamed cleaning liquid for application to the hard floor surface during a scrubbing process according to the present invention is generally indicated at 90. Aerator 90 may include a variety of foam generation devices, including but not limited to, pressurized air and/or pressurized liquid systems, agitation systems, etc. In accordance with one embodiment, aerator 90 is disposed on the housing above scrubbing head 20 and includes an air system 92 for pressurizing air that is mixed with the flow 70 of cleaning liquid from dispensing system 60 in a first fluid mixing member 96. The mixed air and cleaning liquid can then be provided to a second fluid mixing member 98 for further mixing. A fluid distributor 71 directs the foamed aerated cleaning liquid generated by the mixing members 96 and 98 to the hard floor surface or other component of cleaner 10. The volume flow rate of the foamed aerated cleaning liquid delivered through fluid distributor 71 is substantially controlled by the volume flow rate of flow 70 of cleaning liquid and, thus, the cleaning liquid dispensing system 60.

Referring particularly to FIG. 7, additional aspects of the cleaning liquid aerator 90 will be described. The air system 92 for generating and conveying pressurized air includes an air pump 100, a check valve 102, and associated fluid conduit sections 104 and 108. Suitable types of air pumps 100 include piston, diaphragm or rotary vane pumps. One preferred air pump 100 is a piston pump model number 22D1180-206-1002 manufactured by Gast Manufacturing, Inc., of Benton Harbor, Mich. Check valve 102 is provided for back flow prevention of cleaning liquid into the air pump 100. Check valves can also be positioned in line with dispersing system 60 to prevent the back flow of fluid therethrough. The pressure at the output of air pump 100 is greater than that at low pressure side 84 of flow restriction member 68, such as approximately 40 psi.

The first mixing element 96 receives pressurized air from the air pump 100 via conduit section 108 and pressurized cleaning solution from cleaning liquid dispensing system 60 via conduit section 110. The first mixing element 96 (Y-coupling), has a pair of inlet ports 112 and 114 and an outlet port 116 through which the mixture is discharged. First mixing element 96 may be alternatively configured, but should include at least a pair of inlet ports for pressurized air and pressurized cleaning liquid and an outlet port for discharging the mixture. First mixing element 96 may be defined as a passive mixing element. An alternative first mixing element may include active mixing devices, such as energized impeller.

The outlet port 116 of the first mixing element 96 is coupled to the electric solenoid valve 72 via conduit 118. Valve 72 controls the flow of mixture to the second mixing element 98 via conduit section 120. As mentioned above, valve 72 is operable between an open position in which solution is permitted to flow out of the first mixing element 96 and a closed position in which solution flow is blocked. Alternative valves may be used to control the flow of fluid within the system, such as a variable output valve or other suitable component The second mixing element 98 receives and further mixes the pressurized air and cleaning liquid from the first mixing element 96. Second mixing element 98 can be a passive element including a relatively rigid receiver 122 having an inlet port 124 and an outlet port 126. A diffusion medium 128 is contained within the receiver 122. The diffusion medium 108 is capable of producing foam by shearing action, air entrainment or a combination of both. In a preferred embodiment, the diffusion medium 128 includes a plurality of SCOTCH-BRITE brand copper pads, manufactured by Minnesota Mining and Manufacturing Company of St. Paul, Minn. Alternative diffusion media may also be practicable, including but not limited to glass beads, foams, and other porous substrates.

The length and diameter of the receiver 122 as well as structure of the diffusion medium 128, are sized so as to maintain the operating pressure of the foaming system 90 at a desired level. The diffusion medium 128 and receiver 122 size affect the quality of the foam generated in the second mixing element 98. More particularly, using coarser diffusion medium 128 allows for easier passage of the foam through the receiver 122 since there are fewer contact, or blocking, points between medium 128 in the receiver 122. However, the coarser diffusion medium also results in larger foam bubbles. By using a sufficiently long receiver 122 with an appropriate diffusion medium 128, large foam bubbles formed near the upstream end of the receiver 122 will break down into more desirable smaller bubbles prior to reaching the downstream end of the receiver 122. As an example, the receiver 122 of the illustrated embodiment is about 9 inches long and has an inner diameter of approximately 2 inches.

The receiver 122 may be provided at an incline relative to the ground surface so that inlet port 124 is at a slightly lower elevation than outlet port 126. By so providing the inlet port 124 above the outlet port, the amount of aerated cleaning liquid delivered to the scrub brushes 22 after the solenoid valve 72 has closed may be minimized. Various modifications and adaptations to the aerator 90 may be practicable.

Figure 9:
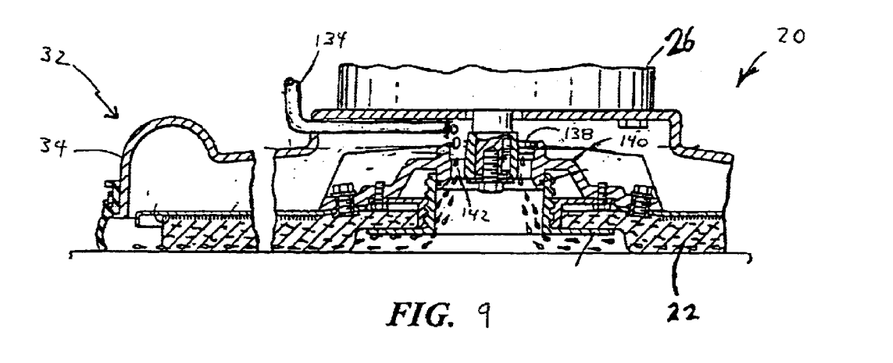
FIG. 9 is a detailed front elevation view of a portion of a scrub head in accordance with an embodiment of the invention.

The foamed cleaning liquid is discharged from the second mixing element 98 and directed toward the fluid distributor 71 via conduit section 130. Flow within conduit 130 is separated by a T-coupling 132 into conduits 134 and 136 of fluid distributor 71. The outlet of conduit sections 134 and 136 are provided above associated scrubbing member 22. As illustrated in FIG. 9, flow from conduits 134 and 136 exits near the center of the scrubbing members 22 to deliver cleaning fluid into an annular trough 138 in the pad driver hub 140. A series of holes 142 in the bottom of trough 122 138 pass the foamed cleaning liquid down to the central region of the scrubbing member 22. During operation, the foamed cleaning liquid (or non-foamed cleaning liquid) is centrifuged out under the scrubbing member 22 in contact with the hard floor surface. Alternative approaches to aerated cleaning liquid delivery would be appreciated by those skilled in the relevant arts.

A foam control switch 144, shown in FIG. 1, is electrically connected to the air compressor 92, cleaning liquid pump 66, and solenoid valve 72 for controlling operation of the aerator system 90. The foam control switch 144 may include a manual switch mounted on the control panel.

Referring again to FIG. 7, in operation, electrical current flows to the air compressor 92, fluid pump 66, and electric solenoid valve 72. Pressurized air is directed through conduit 104, check valve 102, and conduit 108. Cleaning liquid dispensing system 60 delivers pressurized cleaning liquid through pump 66, conduit section 145, flow restriction member 68, and conduit 110. Pressurized air and cleaning liquid is received into the first mixing element 96 and directed via conduit 118 through the control valve 72, and then through conduit 120 and into the second mixing element 98. As the mixture of air and cleaning liquid flows through the diffusion medium 128 of the second mixing element 98, foam bubbles are generated. Foam output from the second mixing element 98 is discharged via conduit sections 130, 134 and 136 to the scrubbing medium 22.

Hard floor surface cleaner 10 generates a relatively wet foam as compared to carpet cleaners to provide the desired wetting of the hard floor surface. A foam's "dryness" may be defined in relation to this volumetric expansion ratio. A "dry" foam has a higher expansion ratio as compared to a "wet" foam. High-expansion foams used in presently available types of carpet cleaning machines are actually relatively "dry" as the ratio of air to water is high. Dry foams are used in carpet cleaning to facilitate quick drying of the cleaned carpet. A "wet" foam is not typically used in carpet cleaning devices as these foams can cause excessive wetting of the carpet which may lead long drying times and mold development. In a particular embodiment, the ratio of volumes between the cleaning liquid (non-aerated) and the foamed cleaning liquid is approximately 1:8. For example, 0.15 gallons of cleaning liquid is aerated to occupy 1.25 gallons. Other volume ratios would yield acceptable scrubbing results.

As the cleaning machine 10 is moved forward, the foamed cleaning liquid is dispensed by fluid distributor 71 through conduit sections 134 and 136 at the front of the chassis and the scrubbing media 22 engage the foamed cleaning liquid and hard floor surface. The foamed cleaning liquid permits an efficient wetting of the hard floor surface, even at dramatically reduced cleaning liquid flow rates (e.g. 0.26 GPM). The process of mechanically working the foam with the scrubbing medium 22 results in substantial defoaming or de-aeration (up to 95% reduction in volume) of the foamed cleaning liquid prior to soiled solution recovery. In contrast, prior art devices using known chemical detergents may create additional foam by the brush action, necessitating defoaming devices as mentioned herein.

A soiled solution of cleaning liquid and soil is developed by the interaction of the scrubbing medium 22 in contact with the foamed cleaning liquid and the hard floor surface. The soiled solution includes partially de-aerated cleaning liquid and soil released from the hard floor surface. The soiled solution is recovered from the hard floor surface by recovery system 32 and conveyed to recovery tank 12.

The recovered soiled solution may be treated to reduce foam using various defoaming techniques, including an addition of defoaming chemical to the recovery tank 12. In the embodiment described herein, the soiled solution is substantially defoamed during the scrubbing process. The above referenced particular surfactant beneficially yields a foamed cleaning solution which rapidly de-aerates after contact with the rotating scrub brushes 22. As a result, in a preferred embodiment no additional defoaming devices or chemicals are required.

The scrubber 10 may include a defoaming device or system to reduce the volume of the collected soiled solution. The defoaming device or system may be part of the soiled solution collection and handling device 32 or may be disposed in relation to the soiled solution tank 12. The defoaming device or system may include a chemical defoaming system for applying a defoaming chemical to collected foam. The defoaming device may include an acoustic and/or mechanical defoaming device.

Figure 10:
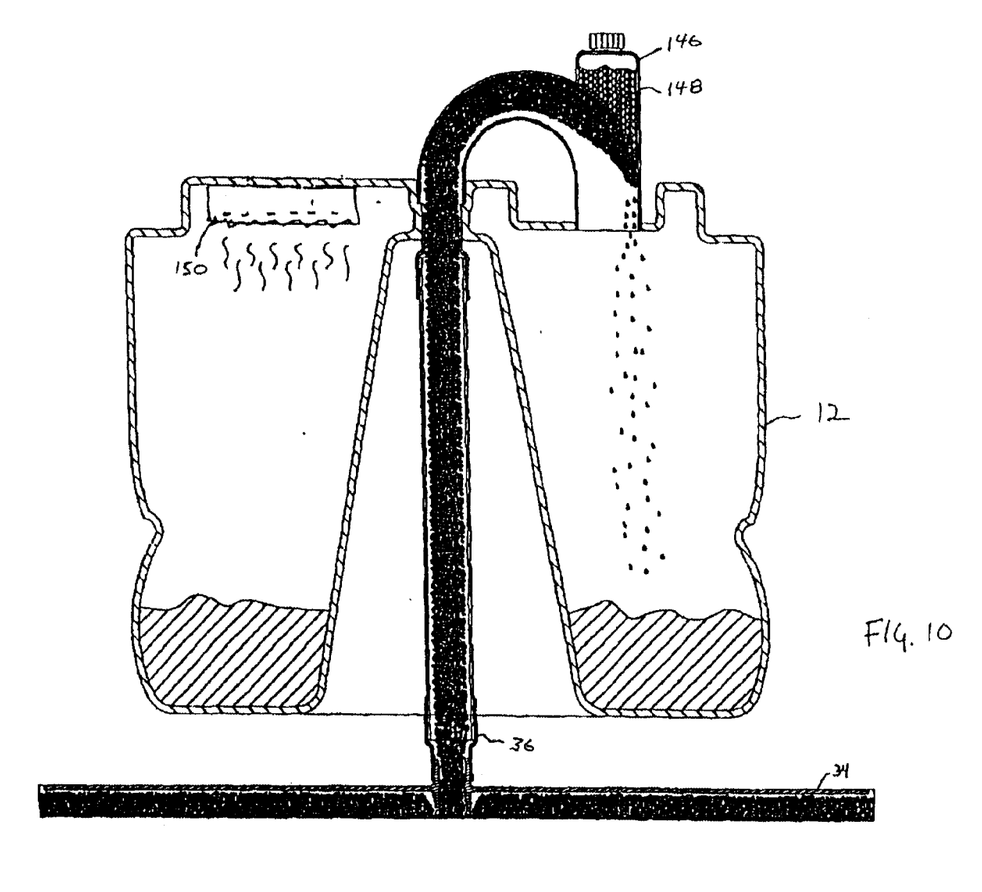
FIG. 10 is a cross-sectional view of a recovery system in accordance with various embodiments of the invention.

FIG. 10 is a cross sectional view taken through the recovery tank 12, vacuum conduit 36, and vacuum squeegee 34, which illustrates a defoaming device 146 in accordance with an embodiment of the invention. Defoaming device 146 may be a selective device finding applicability in high foam situations. Foamed liquid lifted from the squeegee 34 through vacuum conduit 36 is passed by the defoaming device 146 containing a defoaming chemical 148. The defoaming device 146 is a passive device allowing the chemical 148 to passively interact with the recovered foam. The defoaming device 146 may have a porous or perforated element for promoting contact between the defoaming chemical or defoamant 148 and the recovered foam. One particular defoamant which may be used is FOAM-OUT™ manufactured by LaPorte Water Technologies, Inc., of Alpharetta, Ga. Alternative defoaming devices or defoamants may also be practicable.

Another defoaming device, generally designated as 150, is also illustrated in FIGS. 2 and 10. Defoaming device 150 is a radiant heating element disposed above the soiled solution in the recovery tank 12. Radiant heating element 150 may be an electric heating element powered by the batteries 52 (FIG. 1), or may be powered by another heat source, such as propane or recovered heat from an IC engine. Radiant heating element 150 functions to de-aerate foam within the solution tank 12 via a thermal process. One or more radiant heating elements 150 may be utilized in embodiments of the present invention.

Additional aspects of the present invention will be addressed. Regarding the foam system, alternative foam generation systems may be practicable. In the above described embodiment of aeration system 90, a compressed air and pressurized cleaning liquid process is utilized. Other means for generating the foam-like aerated cleaning liquid may be utilized.

One such alternative aeration system utilizes an agitation process. The agitation process uses a mechanical device, such as a rotating impeller, to engage and entrain air within a solution. U.S. Pat. Nos. 3,761,987 and 3,931,662 each disclose an agitation-type foam generator, the disclosures of which are incorporated by reference herein.

Referring to FIGS. 7 and 8, an additional chemical dispensing aspect of the present invention is disclosed. As mentioned above, a chemical dispenser 77 can include devices or systems for providing, distributing, releasing, injecting, conveying, and/or dosing a chemical (typically a surfactant) or chemicals into a primary cleaning liquid component, such as water, to create the cleaning liquid. The chemical is preferably in a concentrated form. Chemical dispenser 77 may include active and/or passive elements. A passive element chemical dispenser is illustrated in FIG. 8, wherein the cleaning agent 74 is permitted to diffuse through a porous medium 154 and into conduit 120.

Figure 11:
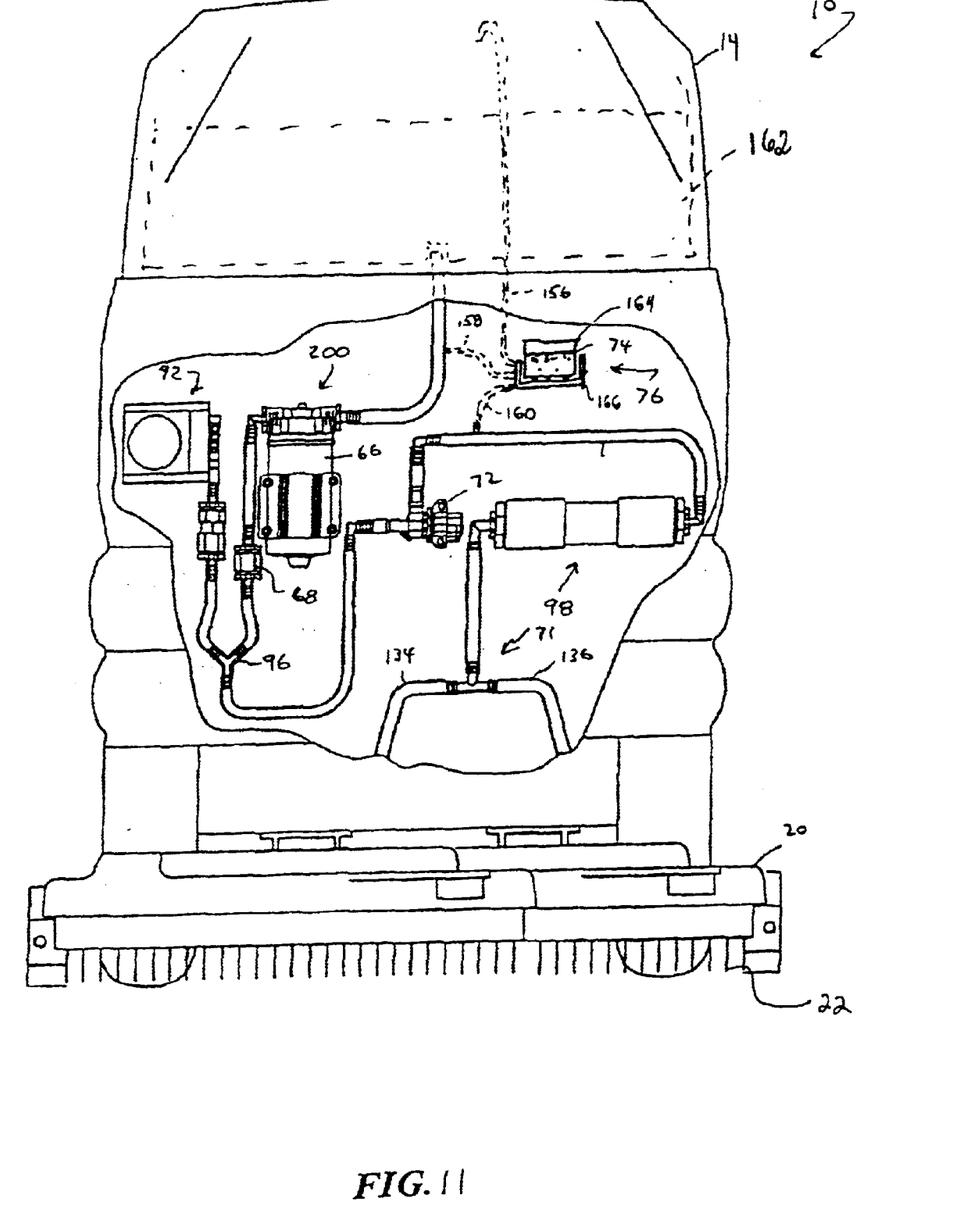
FIG. 11 is a front elevation view of a hard floor surface cleaner in accordance with an embodiment of the invention.

An active chemical dispenser 77 is illustrated in FIG. 11, wherein the cleaning agent 74 is pumped through one or more conduits 156, 158, 160 for mixing with the primary cleaning liquid component. In one embodiment, chemical dispenser 77 may dispense the cleaning agent to a water tank 162 via conduit 156 for mixing with a predetermined volume of water, such as during refilling. In another embodiment, chemical dispenser 77 may dispense the cleaning agent via lines 158 and/or 160 for mixing within the associated conduits to generate the cleaning liquid.

Yet another aspect of the chemical dispenser 77 includes the provision of a removable cartridge 164 containing the cleaning agent 74 and/or other chemicals. The term "cartridge" as used herein is broadly meant to include structures for holding a chemical, including but not limited to sealed or unsealed tanks, bottles, vessels, bladders, and other containers. The cartridge 164 may be specifically adapted to engage a retaining structure 166 on the machine 10. A variety of cartridges 164 and retaining structures 166 would be appreciated by those skilled in the relevant arts. Additionally, chemical 76 can be configured to switch between multiple chemical cartridges 164 to provide quick cleaning agent changes during operation of cleaner 10. Each cartridge can have a different cleaning agent and/or chemical contained therein. For example, a first chemical cartridge 164 may include a surfactant and other chemicals (such as disinfectants, solvents, alkaline builders, etc.) specifically adapted for a heavily soiled surface, with a second chemical cartridge 164 being adapted for lightly soiled surface.

Fluid distribution of the aerated cleaning liquid may include alternative structures. For example, the aerated or non-aerated cleaning liquid may be sprayed on the hard floor surface or scrubbing medium 22 or both. The aerated or non-aerated cleaning liquid may be delivered through the scrubbing medium 22, such as via apertures in the scrubbing medium 22, and/or applied directly to the floor surface in front of scrubbing medium 22. Distribution of aerated and non-aerated cleaning liquid may include a selective application to the hard floor surface, the brushes, or both. Alternative distribution systems may be appreciated by those skilled in the relevant art.

Although the present invention has been described with reference to preferred embodiments, workers skilled in the art will recognize that changes may be made in form and detail without departing from the spirit and scope of the invention

What is claimed is:

1. A cleaning liquid dispensing system of a mobile hard floor surface cleaner having a supply of cleaning liquid, the system comprising:
    fluid conduit configured to receive a flow of cleaning liquid from the supply of cleaning liquid;
    a pump in line with the fluid conduit and having an outlet that is maintained at a high pressure, the pump configured to drive the flow of cleaning liquid through the conduit and the outlet; and
    a flow restriction member configured to generate a pressure drop in the conduit thereby restricting the flow of the cleaning liquid therethrough.

2. The system of claim 1, wherein the flow restriction member includes a plate having an orifice therethrough.

3. The system of claim 2, wherein the diameter of the orifice is approximately 0.03 inch.

4. The system of claim 1, wherein a flow rate of the flow of cleaning liquid is less than 0.5 gallons per minute.

5. The system of claim 1, wherein the pressure at the outlet of the pump is variable.

6. The system of claim 1, wherein the pressure at the outlet is held substantially constant.

7. The system of claim 6, wherein the pressure at the outlet is approximately 40 psi.

8. A hard floor surface cleaner including the system of claim 1.

9. A cleaning liquid dispensing system of a mobile hard floor surface cleaner having a supply of cleaning liquid, the system comprising:
    fluid conduit in fluid communication with the supply of cleaning liquid;
    a pump in line with the fluid conduit and having an outlet that is maintained at a high pressure, and an output flow of cleaning liquid through the outlet and the conduit; and
    a flow restriction member in line with the conduit and the flow of cleaning liquid, the flow restriction member having an upstream high pressure side and a downstream low pressure side, thereby generating a pressure drop in the conduit that restricts a flow rate of the cleaning liquid through the conduit to a substantially constant value.

10. The system of claim 9, wherein the flow restriction member includes a plate having an orifice therethrough.

11. The system of claim 10, wherein the diameter of the orifice is approximately 0.03 inch.

12. The system of claim 9, wherein the flow rate is less than 0.5 gallons per minute.

13. The system of claim 9, wherein the pressure at the outlet of the pump is variable.

14. The system of claim 9, wherein the pressure at the outlet is held substantially constant.

15. The system of claim 14, wherein the pressure at the outlet is approximately 40 psi.

16. A hard floor surface cleaner including the system of claim 9.

17. A hard floor surface cleaner comprising:
    a supply of cleaning liquid; and
    a cleaning liquid dispensing system including:
        fluid conduit-configured to receive a flow of cleaning liquid from the supply of cleaning liquid;
        a pump in line with the fluid conduit having an outlet that is maintained at a high pressure, the pump configured to drive the flow of cleaning liquid through the conduit and the outlet; and
        a flow restriction member configured to generate a pressure drop in the conduit thereby restricting the flow of the cleaning liquid therethrough.

18. The cleaner of claim 17, wherein the flow restriction member includes a plate having an orifice therethrough.

19. The cleaner of claim 18, wherein the diameter of the orifice is approximately 0.03 inch.

20. The cleaner of claim 17, wherein a flow rate of the flow of cleaning liquid is less than 0.5 gallons per minute.

21. The cleaner of claim 17, wherein the pressure at the outlet of the pump is variable.

22. The cleaner of claim 21, wherein the pressure at the outlet of the pump is varied in accordance with a velocity of the hard floor cleaner.

23. The cleaner of claim 17, wherein the pressure at the outlet is held substantially constant.

24. The cleaner of claim 23, wherein the pressure at the outlet is approximately 40 psi.

25. The cleaner of claim 17, wherein the cleaning liquid includes a primary cleaning component and a cleaning agent.

26. The cleaner of claim 25, wherein the ratio of primary cleaning component to cleaning agent is approximately 1000:1.

27. The cleaner of claim 25, where in the cleaning agent includes an anionic surfactant, a nonionic surfactant, and/or a cationic surfactant.

28. The cleaner of claim 17, including:
    a supply of a primary cleaning component; and
    a chemical dispenser having an output flow of cleaning agent; and
    a fluid mixing member configured to combine the primary cleaning component and the output flow of cleaning agent and produce the supply of cleaning liquid.

29. The cleaner of claim 28, wherein the chemical dispenser includes a removable cartridge containing a supply of the cleaning agent.

30. The cleaner of claim 17, wherein the cleaning liquid is a primary cleaning component.

31. The cleaner of claim 30, including:
    a chemical dispenser having an output flow of cleaning agent; and
    a fluid mixing member in fluid communication with the chemical dispenser and the cleaning liquid and producing an output flow comprising a combination of the cleaning agent and the cleaning liquid.

32. The cleaner of claim 17, including:
    a fluid distributor in fluid communication with the conduit and directing the flow of cleaning liquid to a hard floor surface;
    a scrubbing member engaging the hard floor surface and the cleaning liquid; and
    a fluid recovery device adjacent the scrubbing member, the fluid recovery device removing at least a portion of the cleaning liquid from the hard floor surface.

33. The cleaner of claim 32, wherein the scrubbing member includes a rotatable scrub medium.

34. The cleaner of claim 33, wherein the scrub medium is a cylindrical-type scrub brush rotated about a generally horizontal axis of rotation relative to the hard floor surface.

35. The cleaner of claim 32, wherein the fluid recovery device is a vacuum device for conveying soiled cleaning liquid from the hard floor surface.

36. The cleaner of claim 17, including:
an aerator in fluid communication with the flow of cleaning liquid, the aerator converting the cleaning liquid to a foam-like aerated cleaning liquid;
a fluid distributor directing the foam-like aerated cleaning liquid onto the hard floor surface;
a scrubbing member engaging the hard floor surface and the foam-like aerated cleaning liquid; and
a fluid recovery device downstream of the scrubbing member and removing at least a portion of the foam-like aerated cleaning liquid from the hard floor surface.

37. The cleaner of claim 36, wherein the aerator includes a mixing member receiving the flow of cleaning liquid, pressurized air, or both.

38. The cleaner of claim 36, wherein the cleaning liquid is collected such that the foam-aerated cleaning liquid substantially de-aerates on the hard floor surface prior to removal by the fluid recovery device.

39. The cleaner of claim 36, including a defoaming device for de-aerating foam recovered by the fluid recovery device.

40. A mobile hard floor surface cleaner comprising:
a supply of cleaning liquid; and
a cleaning liquid dispensing system including:
fluid conduit in fluid communication with the supply of cleaning liquid;
a pump in line with the fluid conduit and having an outlet that is maintained at a high pressure, and an output flow of cleaning liquid through the outlet and the conduit; and
a flow restriction member in line with the conduit and the flow of cleaning liquid, the flow restriction member having an upstream high pressure side and a downstream low pressure side, thereby generating a pressure drop in the conduit that restricts a flow rate of the cleaning liquid through the conduit to a substantially constant value.

41. The cleaner of claim 40, wherein the diameter of the orifice is approximately 0.03 inch.

42. The cleaner of claim 40, wherein the pressure at the outlet of the pump is variable.

43. The cleaner of claim 40, wherein the pressure at the outlet is held substantially constant.

44. The cleaner of claim 40, wherein the flow restriction member limits the flow rate of the flow of cleaning liquid to less than 0.5 gallons per minute.

45. The cleaner of claim 40, wherein the cleaning liquid includes a primary cleaning component and a cleaning agent.

46. The cleaner of claim 45, wherein the ratio of primary cleaning component to cleaning agent is approximately 1000:1.

47. The cleaner of claim 45, wherein the cleaning agent includes an anionic surfactant, a nonionic surfactant, and/or a cationic surfactant.

48. The cleaner of claim 40, including:
a supply of a primary cleaning component; and
a chemical dispenser having an output flow of cleaning agent; and
a fluid mixing member in fluid communication with the chemical dispenser and the supply of a primary cleaning component and producing the supply of cleaning liquid as combination of the cleaning agent and the primary cleaning component.

49. The cleaner of claim 48, wherein the chemical dispenser includes a removable cartridge containing a supply of the cleaning agent.

50. The cleaner of claim 40, wherein the cleaning liquid is a primary cleaning component.

51. The cleaner of claim 50, including:
a chemical dispenser having an output flow of cleaning agent; and
a fluid mixing member in fluid communication with the chemical dispenser and the cleaning liquid and producing an output flow comprising a combination of the cleaning agent and the cleaning liquid.

52. The cleaner of claim 40, including:
a fluid distributor in fluid communication with the conduit and directing the flow of cleaning liquid to the hard floor surface;
a scrubbing member engaging the hard floor surface and the cleaning liquid; and
a fluid recovery device adjacent the scrubbing member, the fluid recovery device removing at least a portion of the cleaning liquid from the hard floor surface.

53. The cleaner of claim 52, wherein the scrubbing member includes a rotatable scrub medium.

54. The cleaner of claim 53, wherein the scrub medium is a cylindrical-type scrub brush rotated about a generally horizontal axis of rotation relative to the hard floor surface.

55. The cleaner of claim 52, wherein the fluid recovery device is a vacuum device for conveying soiled cleaning liquid from the hard floor surface.

56. The cleaner of claim 40, including:
an aerator in fluid communication with the flow of cleaning liquid, the aerator converting the cleaning liquid to a foam-like aerated cleaning liquid;
a fluid distributor directing the foam-like aerated cleaning liquid onto the hard floor surface;
a scrubbing member engaging the hard floor surface and the foam-like aerated cleaning liquid; and
a fluid recovery device downstream of the scrubbing member and removing at least a portion of the foam-like aerated cleaning liquid from the hard floor surface.

57. The cleaner of claim 56, wherein the aerator includes a mixing member receiving the flow of cleaning liquid, pressurized air, or both.

58. The cleaner of claim 56, wherein the cleaning liquid is collected such that the foam-aerated cleaning liquid substantially de-aerates on the hard floor surface prior to removal by the fluid recovery device.

59. The cleaner of claim 56, including a defoaming device for de-aerating foam recovered by the fluid recovery device.

* * * * *